June 25, 1935.  T. IMAI  2,006,242
AUTOMOBILE LIFTING DEVICE
Filed July 31, 1934  2 Sheets-Sheet 1
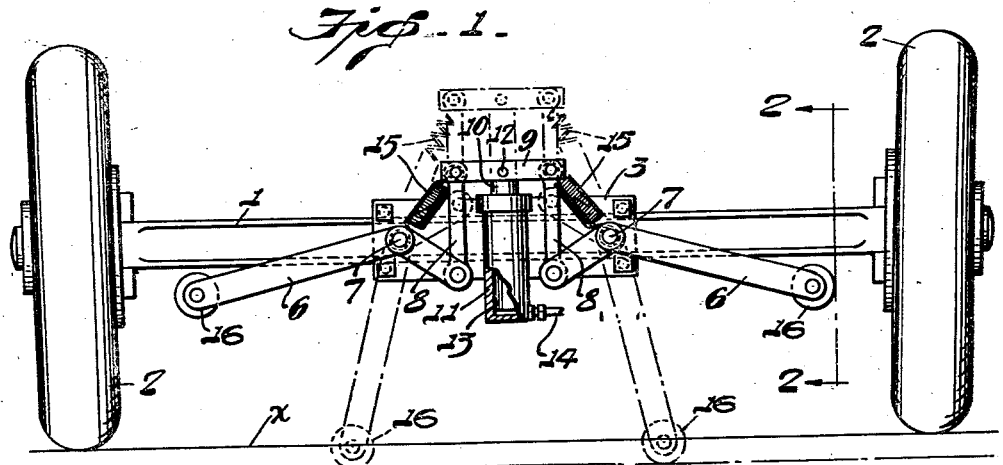
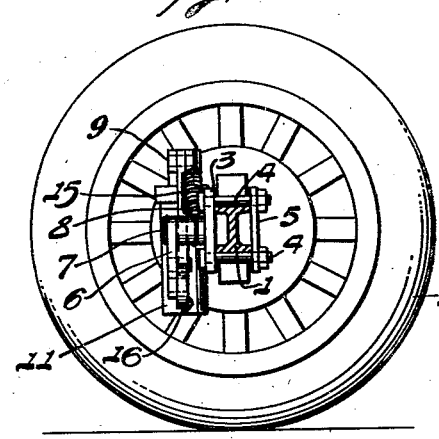
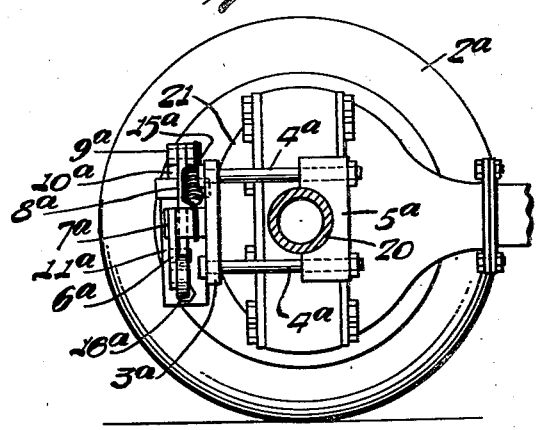
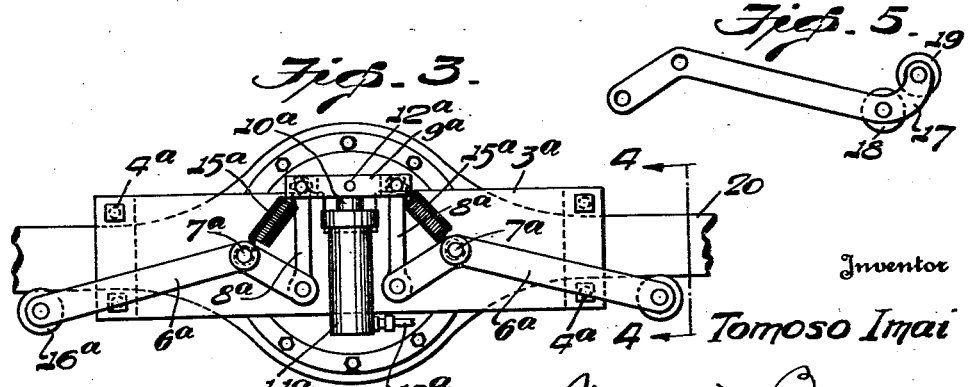
Inventor
Tomoso Imai

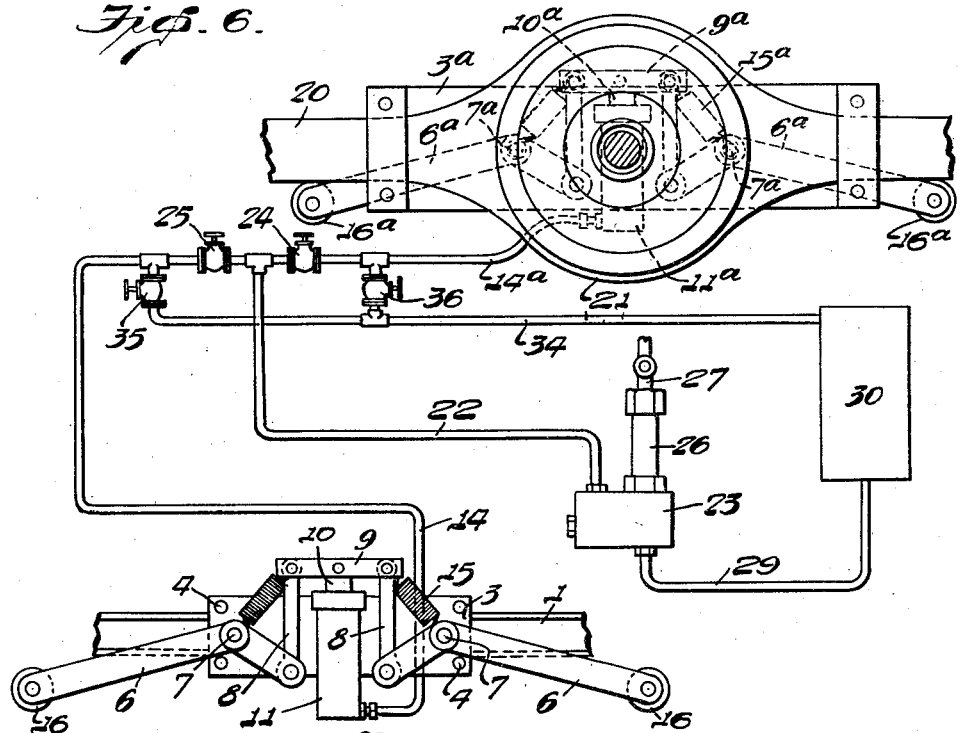
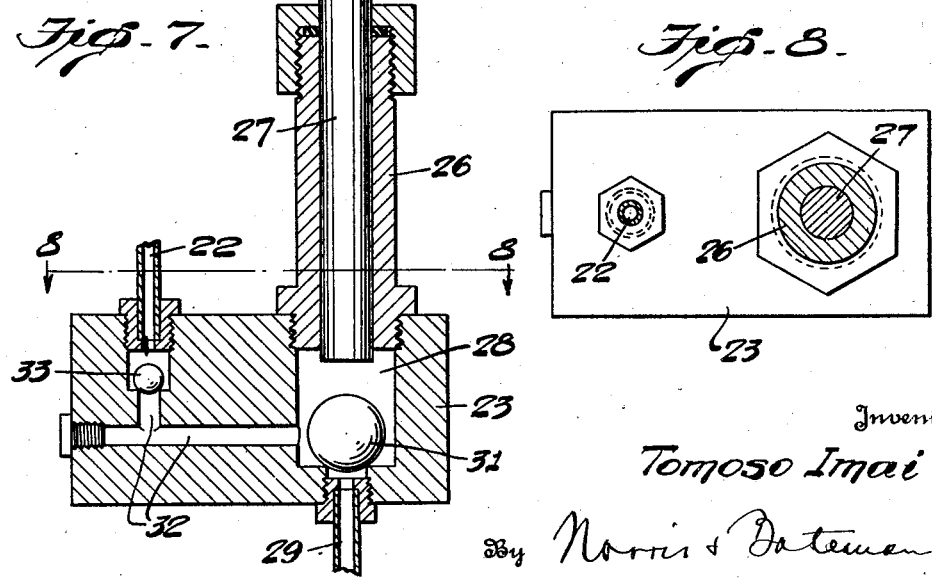

Patented June 25, 1935

2,006,242

UNITED STATES PATENT OFFICE 2,006,242

AUTOMOBILE LIFTING DEVICE

Tomoso Imai, Honolulu, Territory of Hawaii

Application July 31, 1934, Serial No. 737,794

8 Claims. (Cl. 254—86)

The present invention relates to means for lifting some or all of the wheels of an automobile or similar vehicle from the pavement, floor or other surface upon which they rest, for the changing of tires, applying of chains thereto, inspection or repair or other purposes, without the inconvenience of placing a jack or jacks under the automobile by hand.

One of the primary objects of the invention is to provide simplified and improved means whereby either the front wheels or the rear wheels, or both front and rear wheels, may be readily lifted from the supporting surface, at the will of the operator and while the operator is seated in the automobile.

Another object is to provide novel and improved hydraulic means for lifting the front or rear wheels, or both front and rear wheels, which means can be so applied to the front and rear axles as to avoid striking obstacles in the road while the lifting means is in its normal retracted position.

Another object is to provide lifting means the parts of which are assembled on a bracket as a unit so that it may be easily and quickly applied to the usual front or rear axle of an automobile.

A further object of the invention is to provide lifting means of the character referred to which will enable an automobile, while lifted thereby, to be readily moved sidewise, as in parking or in moving the automobile in a garage.

To these and other ends, the invention consists in certain improvements and combinations and arrangements of parts all as will be hereinafter more fully described, the features of novelty being pointed out particularly in the claims at the end of this specification.

In the accompanying drawings:

Fig. 1 is an elevation of the front axle of an automobile equipped with a lifting device embodying the present invention, the lifting device being shown in normal and lifting positions respectively by the full and dotted lines;

Fig. 2 is a vertical section taken on the line 2—2 in Fig. 1;

Fig. 3 is an elevation of a portion of the rear axle of an automobile equipped with a lifting device embodying the present invention;

Fig. 4 is a vertical section taken on the line 4—4 in Fig. 3;

Fig. 5 is a detail view of a modified form of lifting arm;

Fig. 6 is a diagrammatic view showing the lifting devices on the front and rear axles of an automobile and the hydraulic or fluid pressure means for controlling and actuating the lifting devices;

Fig. 7 is a sectional view, on an enlarged scale, of the hydraulic pump for actuating the lifting devices; and Fig. 8 is a transverse section taken on the line 8—8 in Fig. 7.

Similar parts are designated by the same reference characters in the different figures.

Lifting means according to the present invention may be applied to autombiles, trucks or other vehicles of various kinds for lifting some or all of the wheels thereof from the pavement, floor or other supporting surface on which they rest. The preferred embodiment of the invention is shown in the accompanying drawings and will be hereinafter described in detail, but it is to be understood that equivalent constructions are contemplated and such will be included within the scope of the claims.

Referring to the accompanying drawings, I represents the usual front axle of an automobile to which the usual front wheels 2 are attached. The lifting device applied to the front axle, according to the present invention, comprises a bracket or assembly plate 3 which is rigidly fixed to the axle, about midway of its length, by suitable means, such as bolts 4 and cooperating clamping plates 5. This bracket or assembly plate preferably has the operative parts of the lifting device mounted as a unit thereon, the lifting device comprising a pair of lifting arms 6, preferably in the form of bell crank levers which are pivoted on the plate 3 by pivot studs 7 which are fixed to and project from the plate 3. The upper ends of the arms 6 extend inwardly from the pivots 7 and are operatively connected by a pair of substantially vertically extending links 8 to the opposite ends of a cross arm 9. The cross arm 9 is operatively connected to the upper end of a ram 10 which is fitted to reciprocate vertically in a hydraulic cylinder 11, the latter being rigidly fixed to the plate 3 in a position between the inner ends of the arms 6. The cross arm 9 is preferably connected to the upper end of the ram 10 by a horizontal pivot 12 so that the cross arm will be free to rock with respect to the ram and thereby equalize the lifting action applied by the ram to the lifting arms 6. The lower or inner end of the ram 10 is preferably provided with a cupped leather washer 13 to prevent leakage of oil or other liquid in the cylinder past the ram. The lower or free ends of the lifting arms 6 normally extend outwardly toward the respective wheels when these arms are in their normal retracted positions, as shown by the full lines in Fig. 1, the ram 10 being then lowered into the cylinder 11, but when oil or other fluid under pressure is introduced into the lower end of the cylinder 11, as through an oil line or pipe 14, the ram is forced upwardly in the cylinder, thereby lifting the cross arm 9 and the links 8 connected thereto, and these links act on the upper ends of the arms 6 to swing the latter from their normal raised positions as shown by the full lines in Fig. 1 downwardly toward and into the dotted line positions shown in this figure, the lower ends of the lifting arms 6 being thereby brought into engagement with the pavement, floor or other surface $x$ on which the automobile wheels rest and thereby causing the wheels on the respective axle to be lifted from such supporting surface. In order to insure the lifting of the lifting arms 6 into their normal retracted positions, coiled tension springs 15 are preferably connected to the ends of the cross arm 9 and the respective pivot pins 7, these springs acting to force the cross arm 9 downwardly when oil or fluid pressure is released from the bottom of the cylinder, thereby lifting the free ends of the lifting arms into positions closely adjacent to the axle where they will not catch upon obstacles over which the automobile may pass, and the springs 15 will serve to maintain the lifting arms in such normal retracted positions until fluid pressure is introduced into the cylinder to swing these arms into lifting position. The free ends of the lifting arms are preferably provided with rollers 16 to engage the pavement, floor or other supporting surface and thereby assist the swing of these arms into lifting position, and these rollers preferably have their axes arranged transversely of the planes in which the lifting arms swing or transversely of the length of the axle, so that when the axle is lifted by the lifting arms, these rollers thereon will engage the supporting surface and enable the automobile to be moved sidewise. Either a single roller 16 may be mounted rotatably on the free end of each lifting arm as shown in Fig. 1, or the free end of each lifting arm may be curved outwardly as indicated at 17 in Fig. 5 and provided with a pair of rollers 18 and 19, as shown in that figure.

The lifting device for the rear axle is substantially the same as that for the front axle as hereinbefore described, the lifting device comprising a bracket or assembly plate $3^a$ which is fixed by the bolts $4^a$ and clamping members $5^a$ to the rear axle housing 20, the plate $3^a$ bearing at its intermediate portion against the rear side of the usual differential gear housing 21 as shown in Figs. 3 and 4, and the parts of the lifting device carried as a unit on the plate $3^a$ comprise a pair of lifting arms $6^a$ pivoted on the pivot pins $7^a$ projecting from the plate $3^a$ and being operatively connected at their upper ends, by links $8^a$ to the opposite ends of a cross arm $9^a$, the latter being pivotally or rockably mounted, as by a horizontal pivot pin $12^a$, upon the upper end of a vertically movable ram $10^a$ reciprocable in a vertical cylinder $11^a$ fixed on the plate $3^a$, the lower end of the cylinder $11^a$ having an oil line or pipe $14^a$ connected thereto, and springs $15^a$ are connected to the cross arm $9^a$ and serve to retract the lifting arms $6^a$ into their normal raised positions and to retain them in such positions. The lifting device thus applied to the rear axle operates in the same manner as that applied to the front axle, as hereinbefore described, to effect the lifting of the rear axle and of the rear wheels of the automobile attached thereto.

The present invention provides simple and efficient means whereby either the pair of front or rear wheels or both the front and rear wheels of an automobile may be lifted from their supporting surface, and moreover, the present invention enables such to be accomplished while the driver or operator is seated in the automobile. As shown in Fig. 6, the oil lines or pipes 14 and $14^a$ connected to the lower ends of the cylinders 11 and $11^a$ of the lifting devices on the front and rear axles are connected to an oil line or pipe 22 which receives oil or other suitable fluid under pressure from a pump 23, this pump being operated in any suitable manner, as by hand lever located adjacent to the driver's seat, valves 24 and 25 being connected in the oil lines 14 and $14^a$ so that by opening one of these valves and closing the other, the oil or other fluid under pressure from the pump will be transmitted to only the lifting device on the front or the rear axle as when the lifting of only one axle and the wheels thereon is desired, and by opening both of these valves, the front and rear axles and the wheels thereon may be lifted simultaneously by the oil or other fluid under pressure from the pump 23. The pump may be of any suitable form, that shown comprising a cylinder 26 in which a plunger 27 is fitted to reciprocate, the pump casing having a chamber 28 which is connected by a pipe 29 to an oil tank or reservoir 30, a ball check valve 31 being provided to admit oil from the pipe 29 into the chamber 28 during the suction strokes of the plunger 27 but closing the pipe 29 to prevent back flow of oil therein during the working strokes of the plunger 27. The pump chamber 28 communicates by passages 32 with the oil line 22 connected to the cylinders of the lifting devices, and a ball check valve 33 is provided to prevent back-flow of oil from the cylinders of the lifting devices to the pump. An oil line 34 is provided to return oil from the cylinders of the lifting devices to the oil tank or reservoir 30, this oil line being connected to the oil lines 14 and $14^a$ through valves 35 and 36 whereby oil may be released from the cylinder of one or the other of the lifting devices and thereby permit the axle to which such lifting device is attached to be lowered.

In operation, when it is desired to lift the front axle and the wheels thereon, the valve 25 is opened and the valves 24, 35 and 36 are closed, and the pump 23 is then operated, the oil or other fluid under pressure delivered from the pump then flowing through the oil lines 22 and 14 into the bottom of the cylinder 11, forcing the ram 10 therein upwardly and thereby lifting the cross arm 9 which in turn swings the outer or free ends of the lifting arms 6 downwardly toward or into the dotted line positions shown in Fig. 1, and the front axle is lowered when desired by opening the valve 35 which permits the oil to flow from the cylinder 11 through the pipes 14 and 34 back into the oil tank or reservoir 30. When it is desired to lift the rear axle and the wheels thereon, the valve 24 is opened and the valves 25, 35 and 36 are closed, after which the pump 23 is operated to draw oil from the tank 30 and force it through the oil lines 22 and $14^a$ into the bottom of the cylinder $11^a$, the ram $10^a$ being thereby forced upwardly, lifting the cross arm $9^a$ and causing the lifting arms $6^a$ to swing into lifting position, and the rear axle is lowered by opening the valve 36, thereby permitting the oil to return from the cylinder $11^a$ through the pipe 34 to the oil tank or reservoir 30. When it is desired to lift both the front and rear axles and the wheels thereon simultaneously, valves 24 and 25 are both opened while the valves 35 and 36 are closed, the pump 23 being then operated, the oil or fluid delivered thereby under pressure being then conducted by the oil lines or pipes 14 and 14ª to the cylinders 11 and 11ª on the front and rear axles and thereby causing the lifting devices to simultaneously lift both axles, and both axles may be lowered by opening the release valves 35 and 36 which permits the oil to flow from the cylinders of both lifting devices back to the oil tank or reservoir.

The lifting arms 6 and 6ª for the lifting devices on both the front and rear axles are adapted to occupy inclined positions, substantially as shown by the dotted lines in Fig. 1, when these lifting arms are in lifted position, so that the weight of the axles on these lifting arms will tend to swing them outwardly or back toward raised or retracted position automatically when the oil or other fluid is released from the respective cylinder, thereby avoiding the necessity of swinging the lifting arms manually out of lifting position when it is desired to lower the axle or automobile, and upon release of the oil or actuating fluid from the cylinder of the lifting device, the springs 15 or 15ª will act automatically to lower the ram 10 or 10ª to expel the oil or lifting fluid from the cylinder and to completely swing the lifting arms 6 or 6ª into their normal raised or retracted position, and these springs will maintain the lifting arms in their normal raised positions close to the under sides of the axles, so that no appreciable obstructions will extend below the axle to catch upon obstructions or objects over which the automobile may pass.

By providing the check valve 33 between the pump 23 and the oil line 22, the oil or other fluid introduced into the cylinders of the lifting devices will be prevented from flowing back to the pump so that the lifting devices will be maintained in lifting position until the oil in the respective cylinder or cylinders is released by opening of the valve 35 or 36 or both of these valves. It will be understood of course that the controlling valves 24, 25, 35 and 36 are preferably located on the automobile adjacent to the driver's seat so that they may be operated conveniently by the driver or operator while occupying his usual position in the automobile.

While the front and rear axles of the automobile are lifted by the lifting devices attached thereto, they will be supported on the rollers 16 and 16ª of the lifting devices, and the automobile may then be moved sidewise while resting on these rollers, such being advantageous in parking an automobile or in moving the same in a garage.

By mounting the operative parts of each lifting device on an assembly plate or bracket adapted to be bolted or otherwise attached to the axle of an automobile, the operation of applying the improved lifting device to an automobile is greatly facilitated.

I claim as my invention:—

1. An automobile lifting device comprising a bracket member having means for attaching it to an axle of an automobile, a pair of lifting arms pivoted intermediate their ends on said member to swing vertically, a cross member, links operatively connecting said cross member and the inner ends of said arms, and means supported on said bracket member and connected to said cross member for actuating the latter, said links and said lifting arms.

2. An automobile lifting device comprising a bracket member having means for attaching it to an axle of an automobile, a pair of lifting arms pivoted intermediate their ends on said member to swing vertically, a cross member, links operatively connecting said cross member and the inner ends of said arms, a fluid pressure cylinder between said links supported on said bracket member, and a ram reciprocable in said cylinder and connected to said cross member for actuating the latter and links to swing said arms to lifting position.

3. An automobile lifting device comprising a bracket member having means for attaching it to an axle of an automobile, a pair of lifting arms pivoted intermediate their ends on said member to swing vertically, a cross member, links operatively connecting said cross member and inner ends of said arms, a fluid pressure cylinder between said links supported on said bracket member, a ram reciprocable in said cylinder and connected to said cross member for actuating the latter and links to swing said arms to lifting position, and springs connecting the cross member to the bracket member and acting to retract the lifting arms to raised position and to normally retain them in raised position.

4. An automobile lifting device comprising a bracket member having means for attaching it to an automobile axle, a pair of lifting arms pivoted on said member to swing vertically, and means for swinging said arms downwardly toward one another into oppositely inclined positions into engagement, at their lower ends, with the supporting surface to lift the axle, the weight of the axle acting on said arms to swing them upwardly from their oppositely inclined lifting positions, and retractile spring means to lift said arms.

5. An automobile lifting device comprising a bracket member having means for attaching it to an automobile axle, a pair of lifting arms consisting of bell-crank levers pivoted thereon to swing vertically, the inner ends of said levers in retracted position extending below their fulcrums, a hydraulic cylinder fixed to said bracket member, a hydraulic ram reciprocable in said cylinder, a cross member extending across the top of said cylinder and connected to said ram, and a pair of depending links on opposite sides of the cylinder pivotally connecting the respective ends of the cross member to the inner ends of said lifting arms.

6. An automobile lifting device comprising a bracket member having means for attaching it to an automobile axle, a pair of lifting arms pivoted intermediate their ends on said member to swing vertically, and means for swinging said arms downwardly toward one another into oppositely inclined positions into engagement, at their lower ends, with the supporting surface to lift the axle, spring means connected to said member and arms, the weight of the axle acting on said arms to initially swing them upwardly from their oppositely inclined lifting positions and said spring means serving to retract said arms, and rollers mounted on the ends of said lifting arms which are engageable with the supporting surface, the axes of said rollers being parallel to the pivotal axes about which the lifting arms swing.

7. An automobile lifting device comprising pairs of lifting arms having means for pivotally mounting the arms of each pair intermediately of their ends on the front and rear axles respectively, each pair of arms having substantially vertically movable adjacent ends, a cylinder mounted on each axle and having a hydraulic ram movable vertically therein and cooperative with said adjacent ends of the lifting arms of each pair for actuating them, a source of fluid pressure supply, means for conducting fluid from said source of supply to the cylinders and hydraulic rams for both pairs of lifting arms, and controlling means for selectively admitting fluid pressure to and releasing it from the cylinder and hydraulic actuating ram for one or the other or both of the pairs of lifting arms.

6. An automobile lifting device according to claim 5 having retracting springs connected to the pivots of the lifting arms and to the cross member.

TOMOSO IMAI.